United States Patent
Jose et al.

(10) Patent No.: US 11,153,165 B2
(45) Date of Patent: Oct. 19, 2021

(54) SYSTEM AND METHOD FOR PROVIDING AN INTELLIGENT EPHEMERAL DISTRIBUTED SERVICE MODEL FOR SERVER GROUP PROVISIONING

(71) Applicant: DELL PRODUCTS L.P., Round Rock, TX (US)

(72) Inventors: Cyril Jose, Austin, TX (US); Yee Ja, Round Rock, TX (US); Marshal F. Savage, Austin, TX (US); Chandrasekhar Puthillathe, Bangalore (IN); Choudary Akkiah Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/675,322

(22) Filed: Nov. 6, 2019

(65) Prior Publication Data

US 2021/0135931 A1 May 6, 2021

(51) Int. Cl.
G06F 8/656 (2018.01)
H04L 12/24 (2006.01)
G06F 8/658 (2018.01)

(52) U.S. Cl.
CPC ............ *H04L 41/082* (2013.01); *G06F 8/656* (2018.02); *G06F 8/658* (2018.02)

(58) Field of Classification Search
CPC . G06F 8/65; G06F 8/656; G06F 8/658; H04L 41/082

See application file for complete search history.

(56) References Cited

U.S. PATENT DOCUMENTS

| | | | |
|---|---|---|---|
| 7,734,730 B2 | 6/2010 | McCanne | |
| 8,555,273 B1* | 10/2013 | Chia | G06F 8/654 717/173 |
| 9,507,566 B2 | 11/2016 | Payne et al. | |
| 9,645,811 B2 | 5/2017 | Carlen et al. | |
| 2006/0010437 A1* | 1/2006 | Marolia | H04M 1/72525 717/168 |
| 2010/0332633 A1* | 12/2010 | Keys | H04L 67/125 709/223 |
| 2013/0205028 A1 | 8/2013 | Crockett et al. | |
| 2014/0280595 A1 | 9/2014 | Mani et al. | |
| 2015/0082432 A1 | 3/2015 | Eaton et al. | |
| 2015/0199519 A1* | 7/2015 | Marr | G06F 8/65 726/22 |
| 2016/0048408 A1 | 2/2016 | Madhu et al. | |
| 2016/0259637 A1* | 9/2016 | Kumar | H04W 8/245 |
| 2020/0285457 A1* | 9/2020 | Meriac | H04L 67/34 |

FOREIGN PATENT DOCUMENTS

| | | |
|---|---|---|
| EP | 1865684 | 12/2007 |
| WO | 2010006132 | 1/2010 |
| WO | 2019099111 | 5/2019 |

* cited by examiner

*Primary Examiner* — Wei Y Zhen
*Assistant Examiner* — Amir Soltanzadeh
(74) *Attorney, Agent, or Firm* — Jackson Walker LLP; Christopher J. Rourk

(57) ABSTRACT

A system for distributing firmware, comprising a group controller operating on a processor and configured to perform an algorithmic process of sending an update task with a download host to one of two or more group members. A group member operating on a processor and configured to perform an algorithmic process of receiving the update task with the download host and to request a payload file from the download host.

17 Claims, 2 Drawing Sheets

US 11,153,165 B2

SYSTEM AND METHOD FOR PROVIDING AN INTELLIGENT EPHEMERAL DISTRIBUTED SERVICE MODEL FOR SERVER GROUP PROVISIONING

TECHNICAL FIELD

The present disclosure relates generally to processor networks, and more specifically to a system and method for providing an intelligent ephemeral distributed service model for server group provisioning.

BACKGROUND OF THE INVENTION

Software updates are usually provided by distributing the software from a central distribution server to a plurality of end points. This process requires a lot of network resources, and is prone to numerous problems.

SUMMARY OF THE INVENTION

A system for distributing firmware is provided that includes a group controller that operates on a processor and that is configured to perform an algorithmic process of sending an update task with a download host to one of two or more group members. The group controller further comprises a memory configured to store a list of group members, a memory configured to store an instruction associated with the update task and a network device configured to transmit the update task over a network. A group member operating on a processor is configured to perform an algorithmic process of receiving the update task with the download host and to request a payload file from the download host. The group member further comprises a memory configured to receive the payload file and an algorithmic process configured to install the payload file for execution by the group member.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
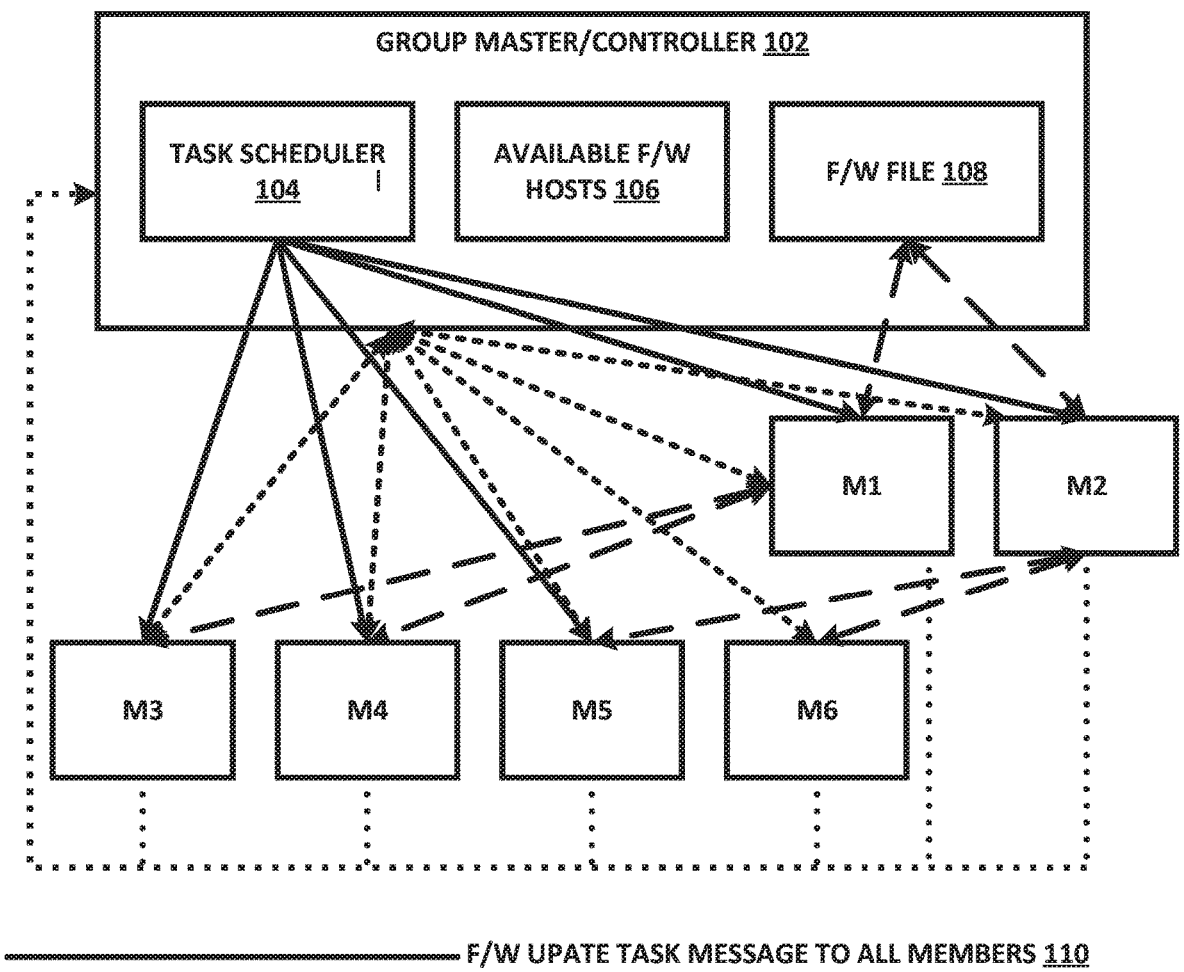
FIG. 1 is a diagram of a system for staging out a firmware file, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Server provisioning can include the steps of a) the server receives a provisioning request, b) the server receives the payload for execution associated with the provisioning request and c) the server performs the provisioning activity specified in the request. Of these three steps, step b) can be subject to complications in grouped environments where a controller or a particular node in the group has an increased network load and/or processing load, which can affect server scalability and the end to end completion time, such as if the payload share is restricted to any particular networked endpoint. The present disclosure provides a system and method for a group firmware update that can be used extensively as an example provisioning activity to elaborate on the proposed solution.

FIG. 1 is a diagram of a system 100 for staging out a firmware file, in accordance with an example embodiment of the present disclosure. System 100 includes group master/controller 102, task scheduler 104, available firmware hosts 106, firmware file 108, group members M1 through M6, firmware update task message to all members 110, request/response for firmware host 112, request and firmware file download 114 and file download provisioning status 116, each of which can be implemented in hardware or a suitable combination of hardware and software.

Group master/controller 102 can be implemented as one or more algorithms operating on one or more processors that cause the processor or processors to provide a task scheduling infrastructure that can be used to orchestrate and consolidate status reporting. In one example embodiment, group master/controller 102 can implement the activation and sequencing of task scheduler 104, available firmware hosts 106, firmware file 108 and firmware update task message to all members 110, such as by reading one or more register entries from one or more data memory devices or receiving one or more data or control messages over a network communications media and by implementing an associated algorithmic structure that causes the task scheduling infrastructure to orchestrate and consolidate status reporting, as discussed and described further herein. In one example embodiment, messaging can be provided to group members M1 through M6 from group master/controller 102 as an ephemeral distributed network service or in other suitable manners. The messaging can include sending data or control messages in a predetermined data format over a network interface and a network communications medium, where the network communications medium can also or alternatively be implemented as a plurality of different media, such as wireless media, wireline media, optical media and other suitable media.

Task scheduler 104 can be implemented as one or more algorithms operating on one or more processors that cause the processor or processors to schedule tasks for group master/controller 102 to update firmware. In one example embodiment, the firmware can be updated as a function of available computing resources or in other suitable manners, as discussed further herein. The firmware can be stored in a data memory device and can be updated using one or more algorithmic processes, or in other suitable manners.

Available firmware hosts 106 can be implemented as one or more algorithms operating on one or more processors that cause the processor or processors to provide a data structure within group master/controller 102 that holds a list of ephemeral firmware hosts that are available at the time. In one example embodiment, the firmware hosts can be instantiated as a function of available computing resources or in other suitable manners, as discussed further herein.

Firmware file 108 can be one or more firmware files that are to be updated at a plurality of member systems. In one example embodiment, firmware file 108 can be stored in one or more data memory devices and can include a plurality of different firmware files, where each different firmware file is associated with a different system and the correct firmware file is determined for each system by group/master controller 102 and its associated systems. Firmware file 108 can alternatively be other suitable data or controls, other suitable code or other suitable files.

Group members M1 through M6 can be implemented as one or more programmable controllers, one or more processors, one or more programmable gate arrays or other suitable systems of components that include firmware or software update functionality, and which also allow each of group members M1 through M6 to function as a firmware or other software distribution point for use in the disclosed architecture, such as where each of group members M1 through M6 are capable of performing the disclosed functions. Group members M1 through M6 can include data memory devices, network communications devices and can implement algorithmic controls for receiving and installing firmware and performing algorithmic firmware operations. Although six group members are shown in this example embodiment, any suitable number of group members can also or alternatively be used, including very large numbers of group members.

Firmware update task message to all members 110 can be implemented as one or more algorithms operating on one or more processors that cause the processor or processors to provide a firmware update task message to all members of a group that have been identified on a list, or in other suitable manners, as discussed further herein.

Request/response for firmware host 112 can be implemented as one or more algorithms operating on one or more processors that cause the processor or processors to provide a request and/or a response for a firmware host to obtain firmware or other suitable software, or in other suitable manners, as discussed further herein.

Request and firmware file download 114 can be implemented as one or more algorithms operating on one or more processors that cause the processor or processors to provide a response to a request and firmware download file, such as in response to a request or in other suitable manners, as discussed further herein.

File download provisioning status 116 can be implemented as one or more algorithms operating on one or more processors that cause the processor or processors to provide a file download provisioning status, such as during the file download provisioning process or in other suitable manners, as discussed further herein.

System 100 provides an example of a binary tree dispersion of firmware file 108 transfer throughout group members M1 to M6. System 100 allows an actual dispersion pattern for firmware file 108 to transfer though group members M1 to M6 to vary dynamically, such as based on the group member count, group master/controller 102 configuration settings and other dynamic conditions and states of system 100. In one example embodiment, group master/controller 102 can stage out firmware file 108 to group members M1 and M2. Group member M1 can function as a firmware download host for group members M3 and M4, and group member M2 can act as a firmware download host for group members M5 and M6. In this manner, group master/controller 102 can provide an intelligent ephemeral distributed network service for group members M1 through M6 for distribution of a firmware file from an associated download host. Once group members M1 though M6 have successfully downloaded the firmware file, they can generate a report message to group master/controller 102 that indicates that they are now available to function as firmware download hosts, and their operational function and status can be updated accordingly. In this manner, firmware updates can easily be scaled to large groups spanning hundreds of thousands of members.

Once group member M1 through M6 receives firmware update task message to all members 110 from group master/controller 102, group member M1 through M6 can implement one or more algorithms that enable them to start processing and coordinating any subtasks required to perform the provisioning request. The algorithms associated with the subtasks include 1) generation and transmission of a request message for the firmware file 108 download host from group master/controller 102, 2) control of downloading of firmware file 108 from a dynamically-assigned download host, such as another one of group members M1 through M6, and 3) invoking a local firmware update command, a local provisioning command or other suitable commands that are needed to install and provision the firmware.

Task scheduler 104 of group master/controller 102 can be configured to implement one or more algorithms that cause it to access a list of available firmware download hosts, such as a list of group members M1 through M6 that have transmitted a message indicating their availability to function as a firmware download host, the respective use counts for those firmware download hosts, an expiration time associated with the firmware for that firmware download host and other suitable data. In one example embodiment, pseudo-code describing certain algorithmic functions associated with various components of a distributed ephemeral service is outlined below.

1) Master pseudo-code: add the master device to a list of available firmware hosts (a use count for each firmware host can be maintained, and an indication can be provided of firmware hosts whose use count is less than a predetermined amount ("X") that are available)

2) Pseudo-code for all group members M1 through M6 that are to be provisioned: generate a master to member message to send a firmware update task with an optional firmware host, a firmware update delay value and other suitable control and/or state data. The firmware update delay can be non-zero for group members that will act as a firmware host.

3) RETRY pseudo-code: this process can include a number of items:
   Generate a member to master message to identify a retry process if the member is not given a file share host.
   Generate a request message for a firmware file host to use.
   Generate a master to member message to respond with a firmware host, where the master waits for a firmware host to be available from a list of available firmware hosts before responding.
   Generate a member to firmware host message to request download of the firmware file.
   Generate a firmware host to member message to download the firmware file.
   Generate a member to master message if the firmware file download is successful, generate a message to send the success status, such as where the master decrements a firmware host use count and adds the member that downloaded the firmware to a list of available firmware hosts.

Generate a fail status message if the firmware download is not successful, where the master does not decrement the firmware host use count if the firmware host is not the master.

Optionally go to RETRY if a number of retries is under a retry count. At the member, perform a firmware update within a predetermined period of time after download, such as may be specified in the firmware task message or in other suitable manners. The master then locally removes the firmware host from the list of available firmware hosts prior to the firmware update of the member, if the number of predetermined downloads has been exceeded, and fails all firmware update members who have not downloaded the firmware file.

These example functions can be implemented by the firmware operating on the master and each member, can be centrally coordinated or can be otherwise implemented as suitable. In one example embodiment, the messages generated can include controls or other data that defines all or part of a described function.

Figure 2:
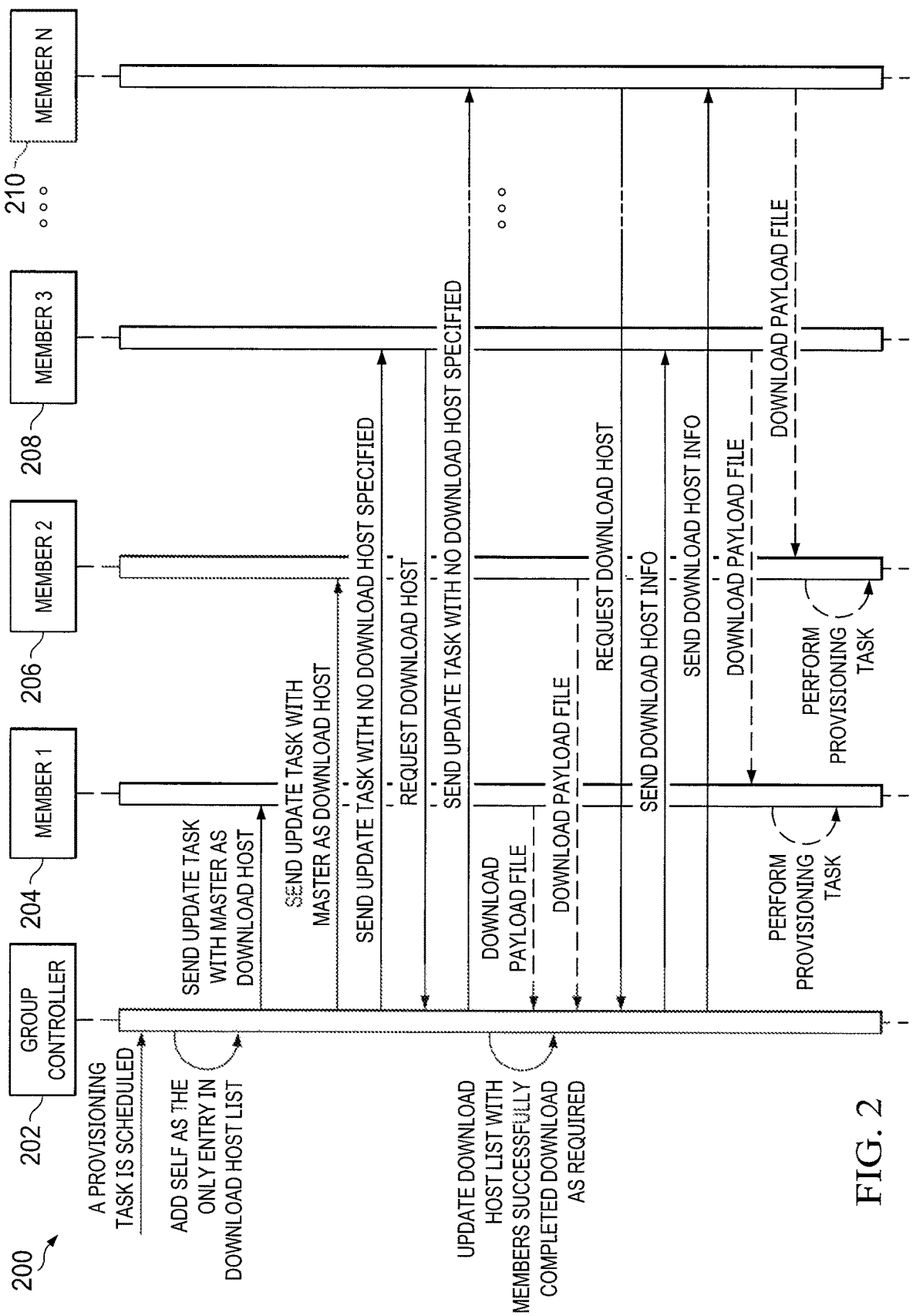
FIG. 2 is a diagram showing a summarized sequence flow representation of a firmware update process, in accordance with an example embodiment of the present disclosure.

FIG. 2 is a diagram 200 showing a summarized sequence flow representation of a firmware update process, in accordance with an example embodiment of the present disclosure. Diagram 200 includes group controller 202, member 1 204, member 206, member 3 208 and member N 210, each of which can be implemented in hardware or a suitable combination of hardware and software.

In the example embodiment of diagram 200, a provisioning task is scheduled at group controller 202. The provisioning task can be implemented as an algorithm operating on a processor that determines whether a variable that is set after a firmware download is present, which indicates that provisioning is needed, and which schedules the task if the variable is present, or other suitable processes can also or alternatively be used.

The group controller 202 then adds itself as the only entry in the download host list. The list entry can be implemented as an algorithm operating on a processor that identifies a name, address or other suitable identifier for a list of identifiers after a firmware download is completed, as a response to a control signal to add a name, address or other suitable identifier to a list, or other suitable processes can also or alternatively be used.

The group controller 202 then sends an update task with the master as the download host to member 1 204, and an update task with the master as the download host to member 2 206. The update task can be sent in response to an algorithm operating on a processor that identifies a name, address or other suitable identifier from a list of identifiers that is to be sent to a predetermined group member, in response to a poll or other suitable processes can also or alternatively be used.

The group controller 202 also sends an update task with no download host specified to member 3 206, which responds with a request for a download host. The update task can be sent in response to an algorithm operating on a processor that identifies a name, address or other suitable identifier from a list of identifiers that is to be sent to a predetermined group member, in response to a poll or other suitable processes can also or alternatively be used. The request for a download host can be sent in response to an algorithm that checks for an identity of a download host and which generates a request if no download host is present, or other suitable processes can also or alternatively be used.

The group controller 202 also sends an update task with no download host specified to member N 210 (where N can represent a suitable number of members), but then receives a payload file download request from group member 1 204 and group member 2 206 and provides the payload file to group member 1 204 and group member 2 206 for download. The payload file can be sent in response to an algorithm operating on a processor that identifies a name, address or other suitable identifier from a request for a payload file, or other suitable processes can also or alternatively be used. The algorithm can also decrement a counter and perform other suitable processes, as discussed herein.

The group controller 202 then updates the download host list with group member 1 204 and group member 2 206, which have each successfully completed the download. The host list can be updated in response to an algorithm operating on a processor that identifies a name, address or other suitable identifier that is to be added to a list of identifiers that is to be sent to a predetermined group member after a download has been completed, or other suitable processes can also or alternatively be used.

Group controller 202 can then send the updated download host list to group member 3 208 and can respond to a request from group member N 210 with the updated download host list. Group member 3 208 can then download the payload file from group member 1 204, which can then perform provisioning tasks, and group member N 210 can then download the payload file from group member 2 206, which can then perform provisioning tasks.

In this example embodiment, four attributes can be used to control the utilization/allocation of download hosts by the master to the members requesting the firmware file download. The first attribute is the maximum concurrent downloads per download host, and the second is the maximum total downloads per download host. In addition, the maximum download retries per member can be used to represent the RETRY count discussed above, and the download host share timeout can be used to represent the predetermined period of time for a firmware update described above.

The present disclosure relates to a firmware update system and method, but the system and method can be generalized to any suitable server provisioning process which requires a payload to be sourced from a system that is similar to a group master/controller. The present disclosure thus provides for an intelligent determination of a download host and distribution. In another example embodiment, the share can be determined intelligently in manner that network packet delays are minimal for the nodes downloading from the firmware host. For example, if the subset of the members are in the rack connected to a local network switch, one of the nodes with in the rack can be selected as the firmware host for other nodes in the rack. Also, if the constituents of a chassis is part of the group, the chassis server nodes can have the firmware file host from one of the nodes in the chassis.

In accordance with another example embodiment, an elected group controller can maintain an intelligent ephemeral network service for providing responses to queries for firmware download hosts. A dynamic list of firmware download hosts can be maintained at a controller in response to the feedback generated from the distributed group. This architecture provides a fast and scalable process where the network load and the processing load can be shared across the members in the group. The present disclosure also provides for intelligently allocating the file hosts in a manner so that network packet delays are minimal for the nodes downloading from a file host, which can also be referred to as asset location preference. Tree structures and spans can be determined from payload image sizes, and thus can be configurable. In the event of an error, a master can redirect failed file shares to good shares, to ensure better resiliency.

As such, the present disclosure has applicability for Internet of Things (IOT) applications, to allow limited bandwidth and low power processors to be cascaded to the nearest endpoints.

The present disclosure is thus unlike existing solutions, which leverage an external network share process, such as the common Internet file system (CIFS)/the network file system (NFS)/trivial file transfer protocol (TFTP) or other suitable processes, where an external infrastructure is built to handle concurrent downloads with powerful processors. The present disclosure is different in that unified console and file sharing responsibility is shared among server management controllers in a selective, intelligent manner. The present disclosure is also different from the peer to peer, torrent-like file share methods. The present disclosure uses TCP for point to point transfer, where a master controls the load to ensure reliability of the service.

The present disclosure is also different from mirroring or mirrored download managers, because the elected controller maintains the download hosts to provide a short lived action-based service, and can formulate a download tree size and span based on the payload image size or current group size. The present disclosure can be used to allocate the number of file hosts per group member, and to consider the physical location of the member (such as under a switch, with in a chassis or in a local network). An integrated remote access controller connected to a remote access controller switch can be allocated a firmware download host in the same remote access controller. The group controller can provide orchestration to ensure that only some nodes are being updated at a time, to prevent the cluster from experiencing an update storm or a boot storm.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for distributing firmware, comprising:
    a group controller operating on a processor and configured to perform an algorithmic process of sending an update task with a download host to one of two or more group members, the group controller further comprising:
        a memory configured to store a list of group members;
        a memory configured to store an instruction associated with the update task; and
        a network device configured to transmit the update task over a network; and
    a group member operating on a processor and configured to perform an algorithmic process of receiving the update task with the download host and to request a payload file from the download host, the group member further comprising:
        a memory configured to receive the payload file;
        an algorithmic process configured to install the payload file for execution by the group member;
    sending the update task without the download host from the group controller to another of the two or more group members;
    receiving the update task without the download host at the second group member; and
    requesting the payload file from the group member with the download host using the second group member.

2. The system of claim 1 wherein the group controller is further configured to perform an algorithmic process of sending the update task without the download host to another of the two or more group members, wherein the group controller is remote from the download host.

3. The system of claim 2 wherein the other of the group members operates on a processor and is configured to perform an algorithmic process of receiving the update task without the download host and to request the download host from the group member that received the update task with the download host.

4. The system of claim 3 wherein the group controller is further configured to receive the request for the download host and to send the download host in response.

5. The system of claim 3 wherein the group controller is further configured to receive the request for the download host and to determine whether a new download host is available in response.

6. The system of claim 3 wherein the group controller is further configured to receive the request for the download host, to determine whether a new download host is available in response and to send the new download host in response if it is determined that a new download host is available.

7. The system of claim 1 wherein the group controller is further configured to perform an algorithmic process of decrementing a counter associated with the download host.

8. The system of claim 1 wherein the group controller is further configured to perform an algorithmic process of decrementing a counter associated with the download host after sending the update task with the download host to the one of two or more group members.

9. The system of claim 1 wherein the algorithmic process configured to install the payload file for execution by the group member has an associated expiration time after which the algorithmic process terminates.

10. A method for distributing firmware, comprising:
    sending an update task with a download host from a group controller operating on a processor to one of two or more group members, wherein the update task is stored in a memory device and the update task is sent using a network interface device;
    receiving the update task with the download host at a group member operating on a processor, wherein the group member receives the update task using a network interface device and stores the update task in a memory;
    requesting, by the group member, a payload file from the download host by executing one or more algorithmic processes that implement the update task;
    sending the update task without the download host from the group controller to another of the two or more group members;
    receiving the update task without the download host at the second group member; and
    requesting the payload file from the group member with the download host using the second group member.

11. The method of claim 10 further comprising:
    receiving a request for the download host from the second group member; and
    sending the download host to the second group member in response.

12. The method of claim 10 further comprising:
    receiving a request for the download host from the second group member; and
    determining whether a new download host is available in response.

13. The method of claim 10 further comprising
    receiving a request for the download host from the second group member;
    determining whether a new download host is available in response; and
    sending the new download host to the second group member in response if it is determined that a new download host is available.

14. The method of claim 10 further comprising decrementing a payload download counter associated with the download host.

15. The method of claim 10 further comprising decrementing a payload download counter associated with the download host after sending the update task with the download host to the one of two or more group members.

16. The method of claim 10 wherein the one or more algorithmic processes that implement the update task have an associated expiration time after which the algorithmic process terminates for the group member.

17. A system for distributing firmware, comprising:
    a group controller operating on a processor and configured to perform an algorithmic process of sending an update task with a download host to one of two or more group members, the group controller further comprising:
  a memory configured to store a list of group members;
  a memory configured to store an instruction associated with the update task; and
  a network device configured to transmit the update task over a network; and
a first group member operating on a processor and configured to perform an algorithmic process of receiving the update task with the download host, the first group member further comprising:
  a memory configured to receive a payload file;
  an algorithmic process configured to provide the payload file to a second group member using the download host;
sending the update task without the download host from the group controller to another of the two or more group members;
receiving the update task without the download host at the second group member; and
requesting the payload file from the group member with the download host using the second group member.

* * * * *